Jan. 12, 1926.

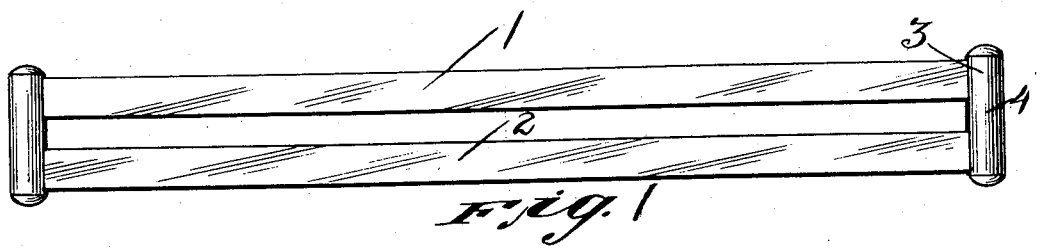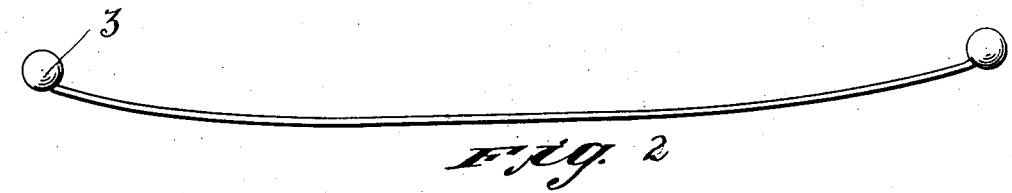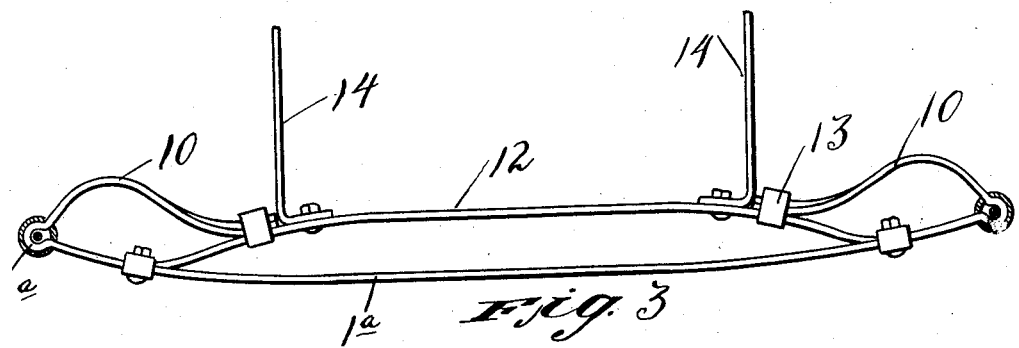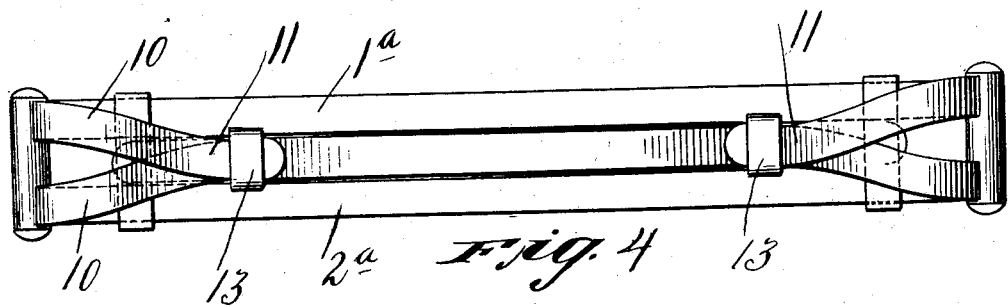

S. VERNET 1,569,441

AUTOMOBILE BUMPER

Filed Dec. 8, 1924      3 Sheets-Sheet 2

INVENTOR.
SERGIUS VERNET
BY
ATTORNEYS.

Jan. 12, 1926.
S. VERNET
AUTOMOBILE BUMPER
Filed Dec. 8, 1924
1,569,441
3 Sheets-Sheet 3
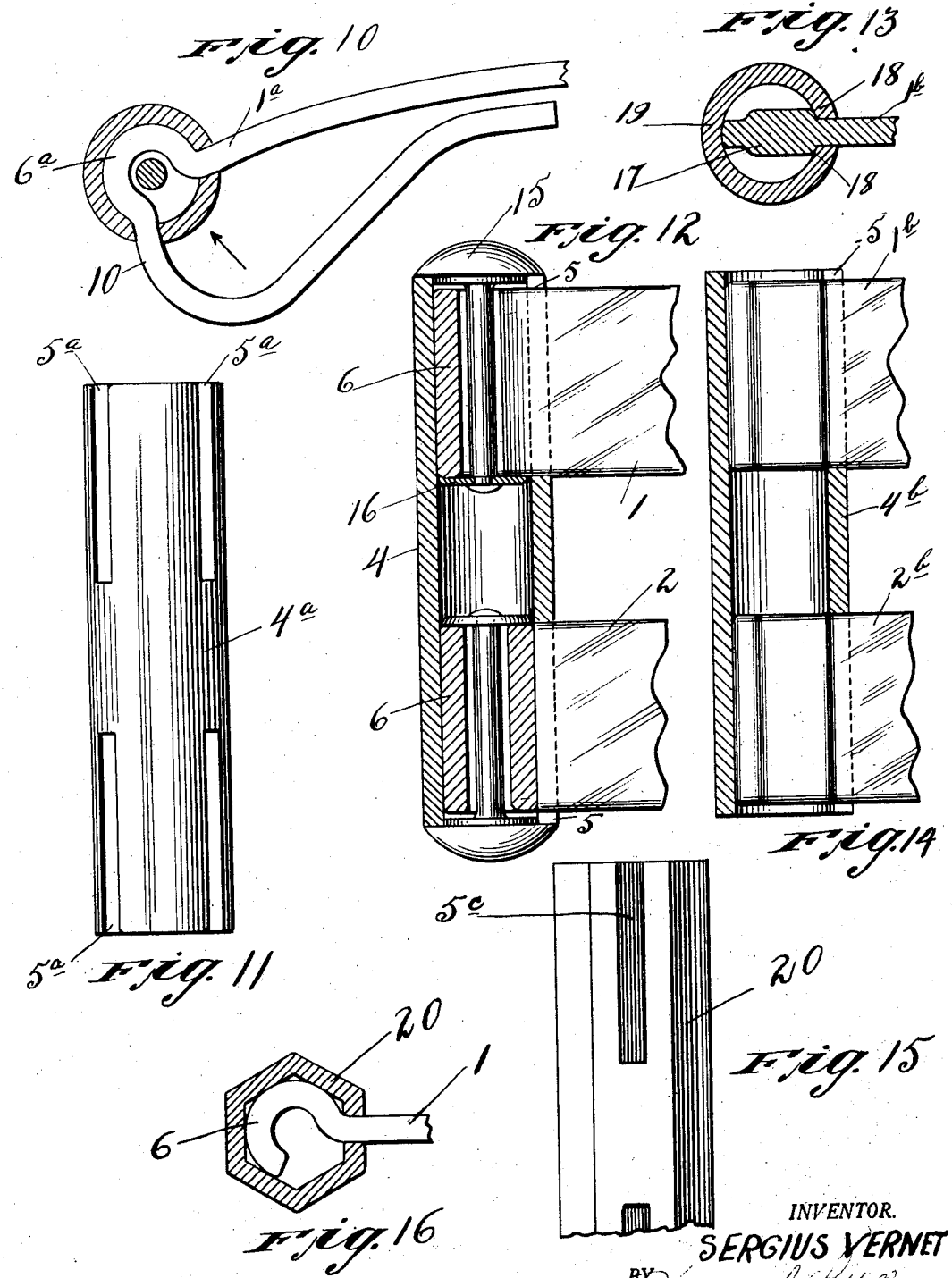
INVENTOR.
SERGIUS VERNET
BY
ATTORNEYS.

Patented Jan. 12, 1926.

1,569,441

UNITED STATES PATENT OFFICE.

SERGIUS VERNET, OF BROOKLYN, NEW YORK.

AUTOMOBILE BUMPER.

Application filed December 8, 1924. Serial No. 754,463.

*To all whom it may concern:*

Be it known that I, SERGIUS VERNET, a citizen of the United States, residing in New York city, in the borough of Brooklyn, county of Kings, and State of New York, have invented certain new and useful Improvements in Automobile Bumpers, of which the following is a specification.

This invention relates to an improvement in automobile bumpers and more particularly to an improvement in end construction of automobile bumpers.

It is one of the objects of the invention to provide a means for securing the ends of a multiple bar automobile bumper together which will be economical, which can be carried out without the use of bolts, nuts or other securing means ordinarily used and which will result in an improved appearance of the ends of the bumper.

Another object of the invention is to provide a parallel bar automobile bumper which can be undetachably assembled as one unit without the use of bolts, nuts or other usual securing devices, and which can be conveniently polished and plated as a unit thereby providing a streamline continuous finish free from unplated portions which might permit rusting to start in service.

Another object of the invention is to provide a method and means for securing the ends of a multiple bar bumper together in frictional engagement with the end holdmembers.

Another object of the invention is to provide a means for securely connecting the ends of a multiple bar automobile bumper together which dispenses with the use of rivets, nuts, bolts and other forms of securing devices which in service become loosened, permit rattling, etc., to the annoyance of the automobilist.

Various other objects and advantages will appear as the description of the invention proceeds.

Referring now to the drawings which show various possible forms of embodiment of my invention, Figure 1 is a front view of a multiple bar bumper constructed in accordance with the invention.

Figure 2 is a plan view of the bumper shown in Figure 1.

Figure 3 is a plan view of a modified form of bumper.

Figure 4 is a view of the bumper shown in Figure 3 taken from the rear.

Figure 10 is a plan view of a modified form of bumper end construction.

Figure 11 is a view of the connecting member shown in Figure 10 looking in the direction of the arrow.

Figure 12 is a sectional view of a modified form of construction.

Figure 13 and Figure 14 are sectional views of a further modified form of construction.

Figure 15 is an elevation of a polygonal connecting member.

Figure 16 is a sectional view of the same showing a bumper bar therein.

Figure 5:
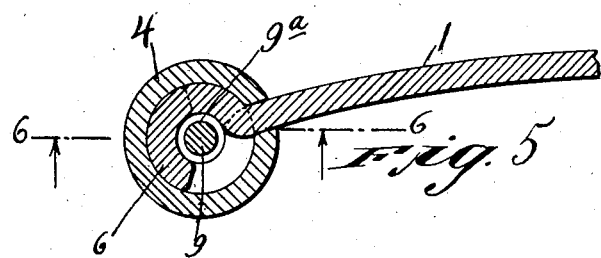
Figure 5 is a sectional view illustrating the bumper end construction.
Figure 7:
Figures 7 and 8 are plan views of the ends of the bumper bars.
Figure 8:
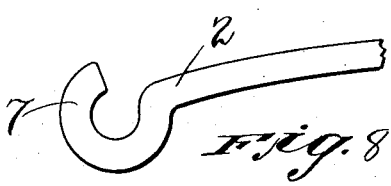
Figure 6:
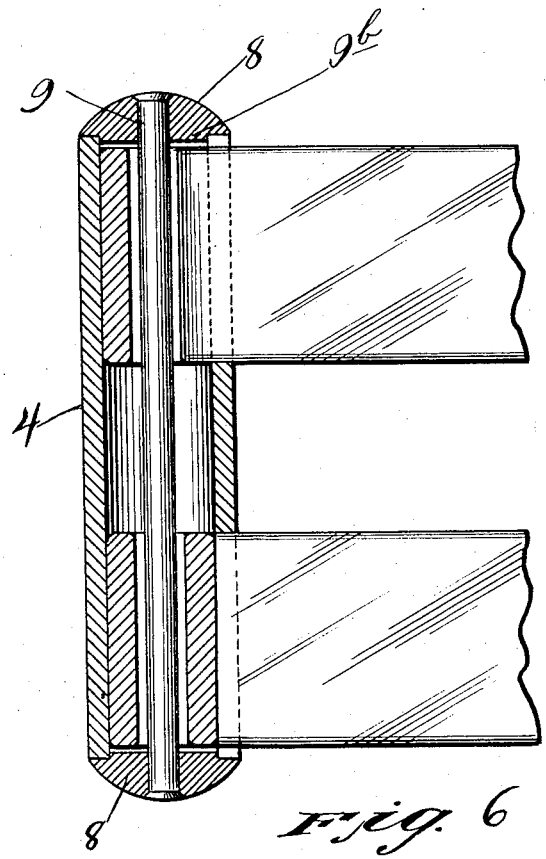
Figure 6 is a sectional view on the line 6—6 of Figure 5.
Figure 9:
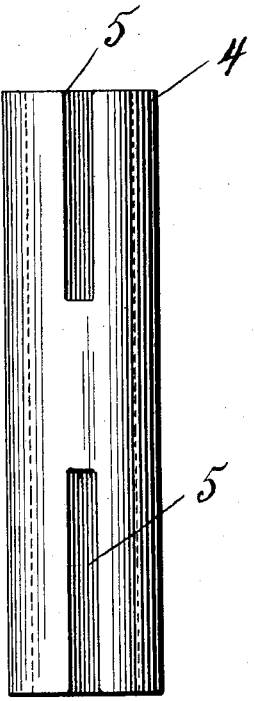
Figure 9 is an elevation of the member which connects the bumper ends.

In the embodiment of the invention illustrated in Figures 1, 2 and 5 to 9 the bumper comprises a pair of impact members 1 and 2 connected together at the ends 3 by means of tubular connecting members 4. Members 4 are preferably of uniform diameter from the top to bottom thereof and are provided with a slot 5 in each end of the members 4 and extending along member 4 to a depth slightly greater than the width of the bumper bars 1 and 2. The bars 1 and 2 are provided at each end with curved or hooked shaped portions 6 and 7, curved preferably in opposite directions, and having the outer circumference of the curve of substantially the same size or perhaps slightly larger than the inner circumference of the tubular member 4. The thickness of the bars 1 and 2 is substantially the same or slightly greater than the width of the slots 5, the circumference of the curved portions 6 and 7 and the thickness of the bars 1 and 2 being so related to the inner circumference of the tubular members 4 and the size of the slots 5 as to cut into and frictionally fit and be permanently retained in the tubular members 4 and slots 5 when driven into the same. In assembling the bumper, the bar 1 is placed above the top of the tubular member 4 and driven or forced into the upper slot 5 with the curved portion 6 making a firm frictional contact with the inner walls of the member 4 and in a similar way the lower bar 2 is driven into the tubular member 4 from the other end. The frictional contact of the ends 6 and 7 with the member 4 is sufficient to retain the members in position and to prevent disassembly of the assembled unit and the portions 6 and 7 being curved in reversed directions overcomes any tendency of the tubular member to become warped or to spring out of vertical alinement. The ends of the bars 1 and 2 are fitted together so tightly that no further securing means is necessary to hold the bars and the tubular member together, the slots 5 assisting to some extent by permitting a slight expansion of the ends of the members 4 when the bars are driven therein.

From the standpoint of service and permanency the connection is completed when the parts are driven together in frictional contact. However as a matter of beauty and adornment it is desirable to provide some sort of closure means for the top of the tubular portions 4. I have therefore shown in Figure 6, a pair of heads or knobs 8 at the ends of the tubular member 4, and a rod 9 for holding the knobs in the position. It is to be understood that these knobs are solely for the purpose of ornamentation and play no part in holding the parts of the bumper together. It will be seen that the space 9ª intervenes between the inner circumference of the curved portions 6 and 7 and the rod 9 and that a space 9ᵇ intervenes between the caps 8 and the bumper bars 1 and 2 so that there is no frictional or other retaining contact between the knobs 8 or rod 9 and the ends of the bumper bar. It is obvious of course that parts 8 and 9 can be omitted except for the ornamental appearance of the bumper.

The bumper as assembled in Figures 1 and 2 can be polished and plated as a unit, thereby plating all irregular surfaces and being plated after assembly, there is no chafing or removal of the plate as in bumpers which are assembled and secured together after plating.

Figures 3, 4, 10 and 11 show a more ornamental and fancy shape of bumper bar, constructed according to the principles of my invention. In these figures the ends of the bumper bars 1ª and 2ª are turned back at the points 6ª forming the recurved portions 10 of the upper and lower bars 1ª and 2ª. The recurved portions 10 are brought together at the point 11 and secured to the back bar member 12 by means of suitable clips 13. Connecting arms 14 are provided for securing the bumper to the vehicle. In this form of embodiment the tubular end members 4ª are provided with a pair of slots 5ª in each end thereof and the curved portion 6ª of the bumper bar at its outer circumference is of substantially the same or of slightly greater size than the interior of the tubular end members 4ª so that when inserted therein, the ends of the bumper bars will make a firm frictional contact with the tubular members 4ª. The slots 5ª receive the front bar portions 1ª and 2ª and the recurved portions 10.

In the embodiment shown in Figure 12, a different form of ornament knob construction is used. This comprises a headed rivet 15 which is loosely fastened in the curved ends of the bumper bars 1 and 2 by means of a plate 16, the shank of the rivet being spaced from the curved portions 6 and 7 and being of greater length than the width of the bumper bar. In assembling this embodiment of the bumper, the rivets 15 are inserted in the curved portions and the curved ends are then driven in the tubular member 4 to make a firm frictional contact therewith. The bumper bars are properly driven to the bottom of the slots 5ª so as to draw the rivets 15 as far into the tubular member 4 as possible to hold the rivets from movement or rattling in the bar.

Figures 13 and 14 show a further modified form of the invention in which the bumper bars 1ᵇ and 2ᵇ are provided with an enlargement 17 near each end thereof, having shoulders 18 which are spaced from the end 19 of the bumper bars, a distance equal to or slightly greater than the inner diameter of the tubular member 4ᵇ, by which the ends of the bars are connected. In assembling this form of bumper, the ends of the bars are driven into the tubular members 4ᵇ and the shoulders 18 abut against the tubular members adjacent the walls of the slot 5 and the ends 19 of the bars make a firm frictional contact with the opposite side of the tubular members 4ᵇ, thereby holding the bars and end member firmly together. In this form of construction it is preferred to omit the ornamental knobs or balls. However, if desired they may be driven into frictional engagement with the ends of the tubular members or may be retained by flattened bolts extending through the tubular members at one or both sides of the ends of the bumper bars.

Figures 15 and 16 show my improvement end construction, using a hexagonal or polygonal shaped tubular portion 20, the bumper bars 1 and 2 having the curved portions 6 and 7 driven in the slots 5ᶜ of the members 20 and being retained therein by friction as in the embodiments above.

As illustrated in Figure 2 the bars 1 and 2 may be made to enter the tubular portion 4 at substantially a tangent line thereby further improving the streamline appearance of the bumper.

It will be understood that various other shapes can be given to the end connecting members 4 or 20 and various ornamental shapes can be given to the knobs 8 and 15. Three or four bar bumpers can be made on the same principle by using longer end members having deeper slots therein and the impact bars instead of being parallel may be permitted to cross each other. The invention is not to be limited by the specific embodiment shown, but contemplates broadly connecting the ends with the bumper bars in frictional contact with the connecting member without the use of nuts, bolts or the like and plating the bar after it has been undetachably assembled as a unit, it being within the scope of the invention to secure the ends of the bumper bars together by means of a solid connecting member fitted on the inside of the curved portions 6 and 7 and engaging same with frictional contact. Various modifications and changes may be made within the spirit of the invention and parts of the device can be used without others.

The term tubular as used in the following claims will be understood to cover both round and polygonal hollow connecting members unless otherwise limited and the term enlarged is used to cover the enlargement of the end portion by the loops 6 and 7 as well as the thickening of the ends as at 17.

I claim:

1. In a bumper construction, the combination of two bars disposed so that one end of one bar is adjacent one end of the other bar, a tubular member having slot means adapted to receive the aforesaid ends of said bars, and to frictionally retain the same in the tubular member.

2. In an automobile bumper, the combination of a plurality of bar members with their ends terminating adjacent one another and in substantially a vertical line, an enlargement on the end of each bar and unitary means extending between said bar end enclosing said enlargements and connecting the bars together by frictional contact therewith.

3. In an automobile bumper, a pair of bar impact members terminating in enlarged end portions and a slotted tubular connecting member surrounding and frictionally gripping said end portions to hold the bars together.

4. In an automobile bumper the combination of a plurality of bar members, with their ends in substantially the same plane, an enlargement on the end of each bar, a tubular member connecting the ends of said bars, slots in the tubular member to receive the bar members, said tubular members surrounding said enlargements and making frictional contact therewith.

5. In an automobile bumper the combination of a plurality of bar members, with their ends in substantially the same plane, an enlargement on the end of each bar, a tubular member connecting the ends of said bars, slots in the tubular member to receive the bar members, said tubular members surrounding said enlargements and making frictional contact therewith, ornamental means for closing the ends of said tubular members and means to retain the ornamental means in place.

6. In an automobile bumper, a plurality of bar impact members, enlarged curved ends on each impact members, and a slotted tubular connecting member having its inner circumference slightly smaller than the outer circumference of said curved ends, surrounding and frictionally holding said bar ends together.

7. In an automobile bumper, a pair of bar impact members, terminating in circular looped end portions, and a slotted tubular connecting member surrounding and frictionally gripping said end portions to hold the bars together.

8. In an automobile bumper, a plurality of bar impact members, enlarged curved ends on each impact member, a slotted tubular connecting member having its inner circumference slightly smaller than the outer circumference of said curved ends, surrounding and frictionally holding said bar ends together, ornamental fixtures closing the ends of said tubular portion and means for holding said fixtures in place, without assisting to hold the bumper bars and end members together.

9. In an automobile bumper a plurality of impact members having a recurved end portion, the curved end portion forming a circular loop of more than 180° and tubular connecting members surrounding and holding said loops and having a pair of slots in each end adapted to receive the impact member and the recurved portion, said tubular end portion being of smaller interior diameter than the said circular loop.

10. In an automobile bumper, a plurality of impact members having recurved end portions, the curved end portion forming a circular loop of more than 180°, tubular connecting members surrounding and holding said loops and having a pair of slots in each end adapted to receive the impact member and the recurved portion, said tubular end portion being of smaller interior circumference than the said circular loop, a back supporting bar, and means to connect said recurved portions to said latter bar.

11. In an automobile bumper, a pair of bar impact members terminating in enlarged end portions, and a slotted tubular connecting member of polygonal shape surrounding and frictionally gripping said end portions to hold the bars together.

12. In an automobile bumper, a plurality of impact members having recurved end portions, the curved end portion forming a circular loop of more than 180°, tubular connecting members surrounding and holding said loops and having a pair of slots in each end adapted to receive the impact member and the recurved portion, said tubular end portion being of smaller interior circumference than the said circular loop, a back supporting bar, means to connect said supporting bar to the impact members, and means to connect said recurved portions to said supporting bar.

13. In an automobile bumper, a plurality of impact members, hollow means surrounding and extending between the ends of the impact members for frictionally holding the same together, means for closing the end of said hollow means, and means extending through the hollow means without contact with the ends of said impact members for holding said closing means on the end of said hollow means.

14. An automobile bumper, comprising a pair of parallel impact bars, tubular means connecting the ends of the bars, said bars being substantially tangent to the tubular connecting means at the front thereof.

In testimony whereof I have affixed my signature to this specification.

SERGIUS VERNET.